United States Patent [19]

Suzuki

[11] Patent Number: 4,631,975
[45] Date of Patent: Dec. 30, 1986

[54] TRANSMISSION OPERATING DEVICE

[75] Inventor: Kazuhiro Suzuki, Nishinomiya, Japan

[73] Assignee: Nippon Cable System Inc., Hyogo, Japan

[21] Appl. No.: 774,845

[22] Filed: Sep. 11, 1985

[30] Foreign Application Priority Data

Oct. 18, 1984 [JP] Japan .................................. 59-219071
Nov. 2, 1984 [JP] Japan .................................. 59-232070

[51] Int. Cl.⁴ ............................ G05G 9/16; F16C 1/12
[52] U.S. Cl. ............................ 74/473 R; 74/471 XY; 74/473 P; 74/501 R
[58] Field of Search .......... 74/471 XY, 473 R, 473 P, 74/501 R

[56] References Cited

U.S. PATENT DOCUMENTS

| | | | |
|---|---|---|---|
| 4,143,560 | 3/1979 | Kinkade et al. | 74/473 R |
| 4,152,950 | 5/1979 | Langford | 74/471 XY |
| 4,270,403 | 6/1981 | West | 74/473 R |
| 4,459,870 | 7/1984 | Gill et al. | 74/471 XY |
| 4,483,211 | 11/1984 | Hurlow | 74/473 R |
| 4,493,224 | 1/1985 | Speelman | 74/473 R |
| 4,524,634 | 6/1985 | Haupt | 74/473 R |

Primary Examiner—Alan Cohan
Assistant Examiner—John A. Rivell
Attorney, Agent, or Firm—Armstrong, Nikaido, Marmelstein & Kubovcik

[57] ABSTRACT

A transmission operating device comprising: a connecting arm of which both ends are connected with ends of two control cables, respectively, and having a first rotational center for rotating the connecting arm in a horizontal plane and a second rotational center for rotating the connecting arm in a vertical plane; a member to be rotated together with the connecting arm, being provided with a splined perforation; a splined shaft being a part of an outer shaft of a transmission, and being inserted into the splined perforation, so that the rotational motion of the connecting arm in the vertical plane is changed into a rotational motion of the outer shaft around an axis of the outer shaft, and a link mechanism being provided between the connecting arm and the outer shaft, so that the rotational motion of the connecting arm in the horizontal plane is changed into a sliding motion of the outer shaft in the direction of an axis of the outer shaft. Therefore, the operation of the transmission can be more promptly and surely performed. Further, the vibration of the mechanism is reduced and the durability thereof is increased.

5 Claims, 9 Drawing Figures

TRANSMISSION OPERATING DEVICE

BACKGROUND OF THE INVENTION

The present invention relates to a transmission operating device and, more particularly, to a transmission operating device using control cables as a means for transmitting an operational force.

A control cable comprises fundamentally a flexible conduit and a flexible inner wire comprising a strand of steel wire, which is slidably inserted into the conduit, and is constructed so as to transmit a push or pull load acted on one end of the inner wire to the other end in order to operate a remote driven device.

A transmission operating device using control cables is recently used as a means for remotely operating a gear transmission in a vehicle such as a front-wheel-device light motorcar having a front engine and a rear-wheel-drive bus or truck having a rear engine. According to such a transmission operating device, weight and cost thereof are reduced and assembling work is made easy.

In general, such a transmission operating device performs a selecting operation and a shifting operation by pushing or pulling inner wires of two control cables in the same direction with each other at the same time or in the reverse direction with each other at the same time.

An object of the present invention is to provide a transmission operating device using control cables by which a transmission can be promptly and surely operated, and which is reduced in vibration and has a high durability.

SUMMARY OF THE INVENTION

According to the present invention, there is provided a transmission operating device comprising: a connecting arm of which both ends are connected with ends of two control cables, respectively, and having a first rotational center for rotating the connecting arm in a horizontal plane and a second rotational center for rotating the connecting arm in a vertical plane, and being constructed so that the connecting arm is rotated in the horizontal plane when the inner wires are pushed or pulled in the reverse direction with each other at the same time, and so that the connecting arm is rotated in the vertical plane when the inner wires are pushed or pulled in the same direction with each other at the same time; a member to be rotated together with the connecting arm, being provided with a splined perforation; a splined shaft being a part of an outer shaft of a transmission, and being inserted into the splined perforation, so that the rotational motion of the connecting arm in the vertical plane is changed into a rotational motion of the outer shaft around an axis of the outer shaft; and a link mechanism being provided between the connecting arm and the outer shaft, so that the rotational motion of the connecting arm in the horizontal plane is changed into a sliding motion of the outer shaft in the direction of an axis of the outer shaft.

The meaning of the words: "splined perforation and splined shaft" includes an original spline structure, a seration structure, a keyway structure, or the like, in the specification.

According to the transmission operating device of the present invention, when the connecting arm is rotated in a vertical plane by pulling or pushing the two control cables, the outer shaft is slided in the direction of the axis of the outer shaft by means of the link mechanism. When the connecting arm is rotated in a vertical plane, the outer shaft is rotated around the axis of the outer shaft by means of the splined perforation and the splined shaft.

The selecting operation (or the shifting operation) is performed by the sliding motion of the outer shaft, and the shifting operation (or the selecting operation) is performed by the rotational motion of the outer shaft.

Further, according to the present invention, there is provided a transmission operating device constructed so as to perform a shifting operation and a selecting operation by pushing or pulling two inner wires of two control cables arranged parallel to each other, comprising: a change speed lever being supported at its middle portion so as to be operated in the direction that the two control cables extend and in the direction perpendicular to the direction that the two control cables extend; a connecting arm being connected with a lower end portion of the change speed lever by means of a ball joint; connecting members for connecting the two inner wires of the two control cables with the connecting arm; and a rotational center being located at the position on the connecting arm apart from the position where the lower end portion of the change speed lever is connected with the connecting arm, and at which the connecting arm is supported so as to rotate around the vertical axis at the rotational center and move in the direction that the two control cables extend.

According to the transmission operating device of the present invention, when the change speed lever is operated in one direction, the two inner wires of the two control cables can be pushed or pulled in the same direction with each other at the same time. When the change speed lever is operated in the direction perpendicular to the one direction, the two inner wires can be pushed or pulled in the reverse direction with each other at the same time.

The shifting operation (or the selecting operation) is performed by operating the two inner wires in the same direction at the same time. The selecting operation (or the shifting operation) is performed by operating the two inner wires in the reverse direction at the same time.

The above and other objects and advantages of the present invention will become apparent from the following description with reference to the accompanying drawings.

DETAILED DESCRIPTION

A structure of an embodiment of a driven side of a transmission operating device of the present invention is described below based on FIGS. 1 to 3. In the drawings, numerals 1, 2 indicate control cables, and numeral 3 indicates a connecting arm. The control cables 1, 2 are arranged within a vehicle body by fixing proper portions of conduits 1a, 2a of the control cables 1, 2 to a frame by means of metal fittings 1b, 2b. Inner wires 1c, 2c of the control cables 1, 2 are connected with rods 1d, 2d at their ends, respectively. The rods 1d, 2d are connected with both ends of a connecting arm 3 by means of ball joints 4, 5, respectively.

Further, the other ends of the control cables extend toward a driving side of the device, as described later. The inner wires 1c, 2c of the control cables 1, 2 are pushed or pulled in the reverse direction with each other at the same time and pushed or pulled in the same direction with each other at the same time by means of the driving side of the transmission operating device.

The connecting arm 3 is provided with a perforation 3a and a casing 6 located below the connecting arm 3 is also provided with a perforation 6a. The perforations 3a and 6a are coaxial with each other. A shaft 7 is inserted into the perforations 3a, 6a. The connecting arm 3 can rotate around the shaft 7, which is a rotational center, in the horizontal plane. The casing 6 has a splined perforation 8 engaged with a splined shaft described later therein. The splined perforation 8 horizontally extends in the direction perpendicular to the direction that the inner wires 1c, 2c of the control cables 1, 2 are pushed or pulled. A splined shaft 9 is inserted into the splined perforation 8 so that the splined shaft 9 can be engaged with the splined perforation 8. An end portion of an outer shaft 10 of a transmission is provided with the splined shaft 9. Shift forks in the transmission are operated by the rotational motion and the sliding motion of the outer shaft. A ball joint 11 is attached to an end of the casing 6. The ball joint 11 is fixed to a supporting frame 12. The casing 6 can rotate in a vertical plane with respect to the ball joint 11 which is a rotational center. Further, the connecting arm 3 connected with the casing 6 by means of the shaft 7 can also rotate in the vertical plane with respect to the ball joint 11. The ball joint 11 supports the casing 6 so that the casing 6 cannot be moved in the axial direction of the outer shaft 10 and, therefore, the ball joint 11 can support a reaction force of the casing 6 when the connecting arm 3 moves the outer shaft 10 in the axial direction via the later described link mechanism.

The connecting arm 3 has a ball joint 13 directed downwardly at a position apart from the perforation 3a. One end of a lever 14 is connected with the ball joint 13. One end of a lever 16 is connected with the other end of the lever 14 by means of a ball joint 15 so that the lever 14 is perpendicular to the lever 16. The other end of the lever 16 is fixed to the outer shaft 10 within the casing 6. That is to say, the connecting arm 3 is connected with the outer shaft 10 by means of a link mechanism comprising levers 14, 16 and ball joints 13, 15.

Figure 4A:
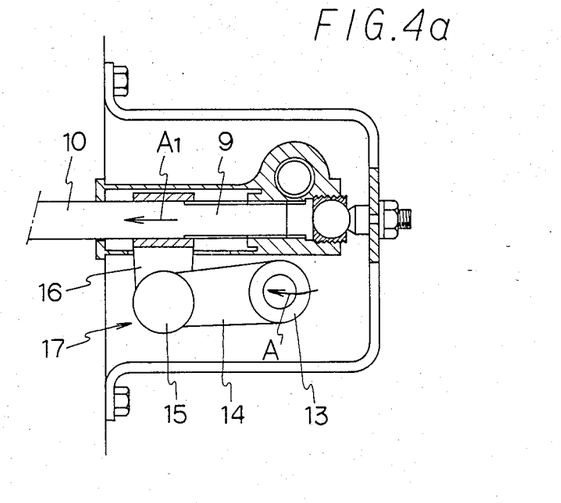
FIGS. 4a and 4b are sectional views taken along a line I—I in FIG. 2 for illustrating sliding motions of an outer shaft.

The operation of the driven side of the device is described below. When the inner wire 1c of the control cable 1 is pushed and the inner wire 2c of the control cable 2 is pulled, the connecting arm 3 is rotated around the shaft 7 in the direction of Arrow A. Therefore, the outer shaft 10 is slided in the direction of Arrow $A_1$ by means of the link mechanism 17, as shown in FIG. 4a.

Figure 4B:
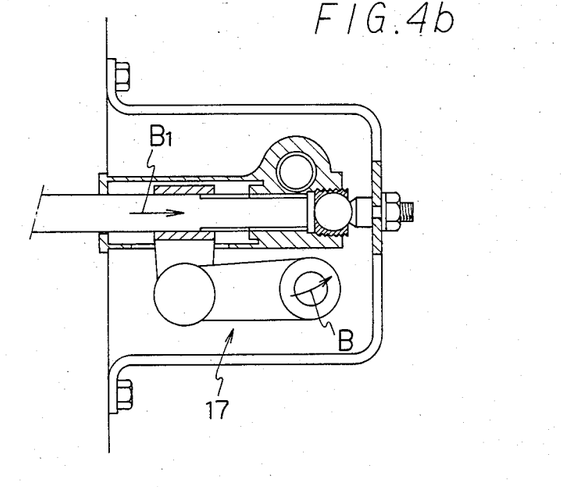

Further, when the inner wire 1c of the control cable 1 is pulled and the inner wire 2c of the control cable 2 is pushed, the connecting arm 3 is rotated in the direction of Arrow B. Therefore, the outer shaft 10 is slided in the direction of Arrow $B_1$ by means of the link mechanism 17, as shown in FIG. 4b.

When the outer shaft 10 is slided in the axial direction by means of the connecting arm 3 and casing 6, an axial reaction force occurred to the arm 3 and casing 6 is transmitted to the frame 12 via the ball joint 11.

Figure 1:
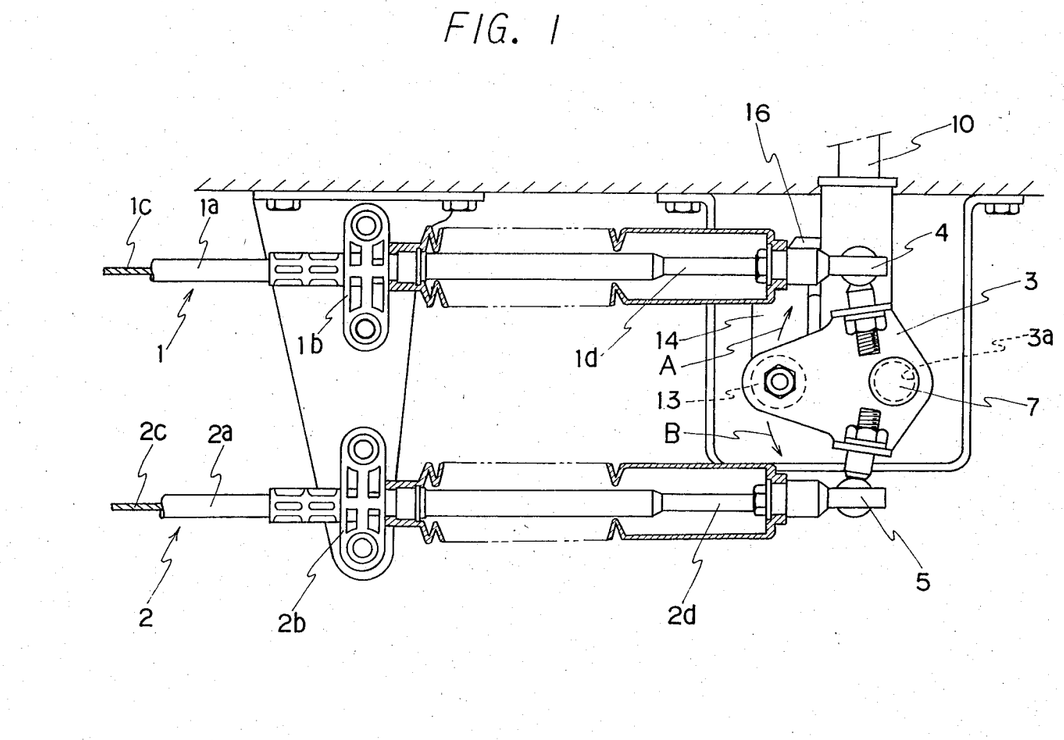
FIG. 1 is a partially sectional plan view showing an embodiment of a driven side of the transmission operating device of the present invention.
Figure 2:
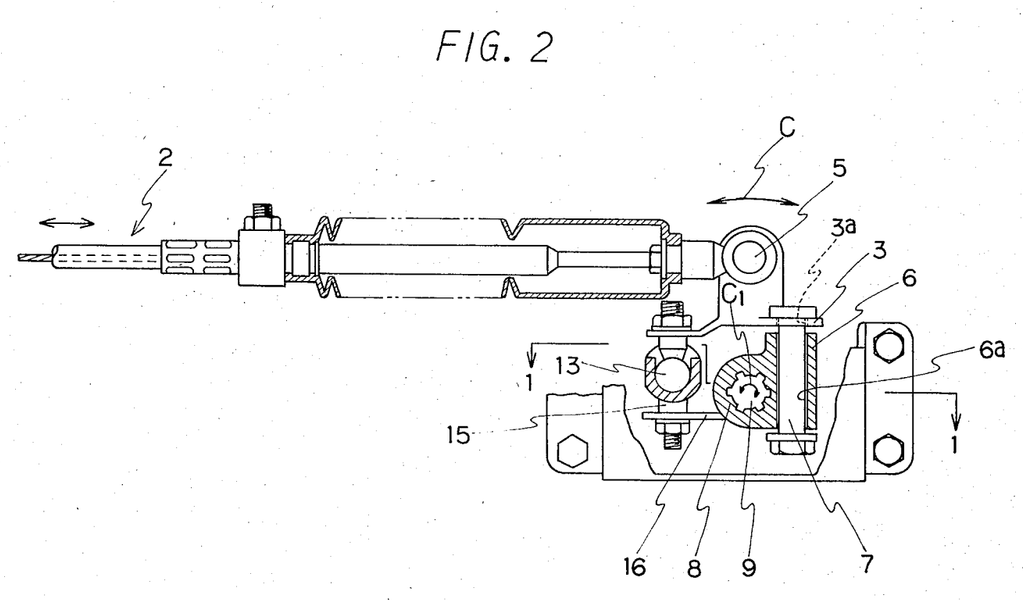
FIG. 2 is a partially sectional front view showing the driven side of the device shown in FIG. 1.
Figure 3:
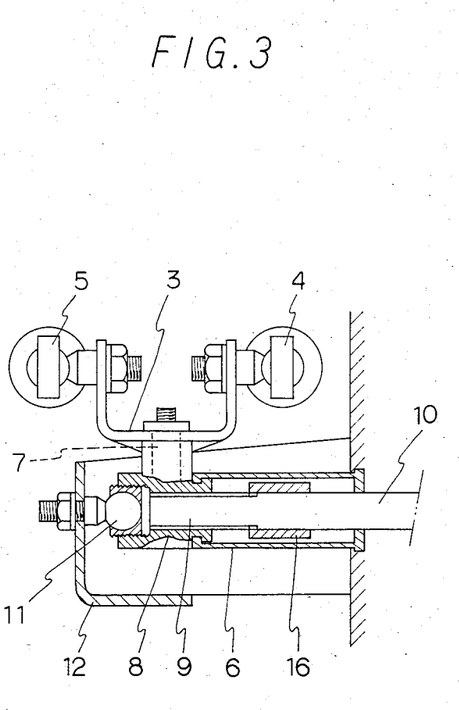
FIG. 3 is a partially cutaway side view showing the driven side of the device shown in FIG. 1.

When the inner wires 1c, 2c shown in FIG. 1 are pushed or pulled in the same direction with each other at the same time, the connecting arm 3 is rotated in the direction of Arrow C shown in FIG. 2 with respect to the ball joint 11. The rotational motion of the connecting arm 3 is transmitted to the splined perforation 8 via the shaft 7 and the casing 6. As a result, the splined shaft 9 is rotated around the axis of the splined shaft 9 in the direction of Arrow $C_1$. The outer shaft 10 is rotated by means of the rotation of the splined shaft 9.

In the above described embodiment, the selecting operation is performed by the sliding motion of the outer shaft 10 in the direction of the axis of the outer shaft 10. On the other hand, the shifting operation is performed by the rotational motion of the outer shaft 10 around the axis of the outer shaft 10. However, the selecting operation may be performed by the rotational motion of the outer shaft 10, and the shifting operation may be performed by the sliding motion of the outer shaft 10.

Figure 5:
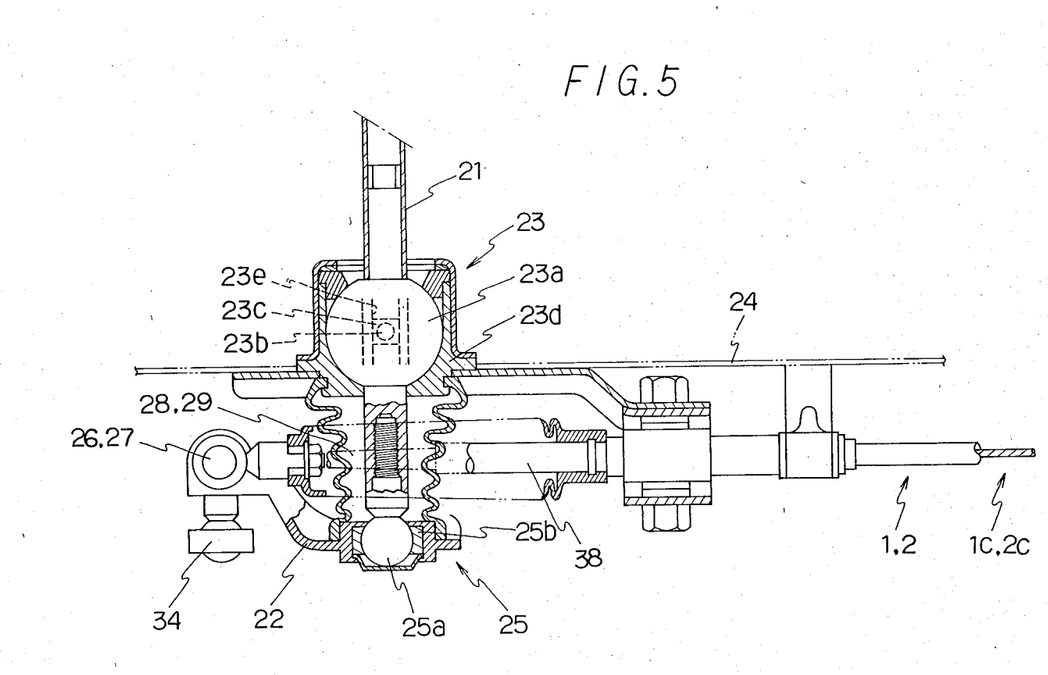
FIG. 5 is a partially sectional plan view showing an embodiment of a driving side of the transmission operating device of the present invention.
Figure 6:
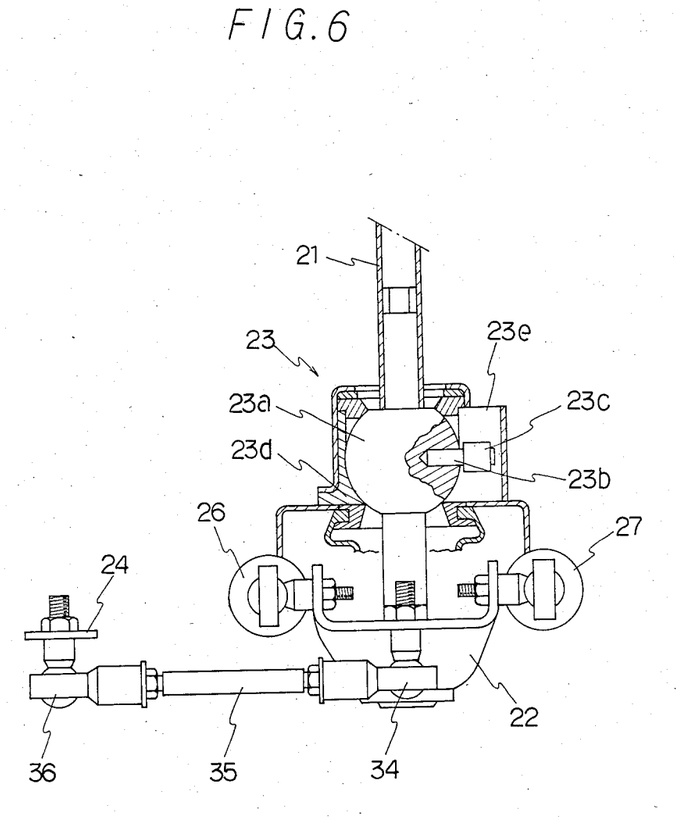
FIG. 6 is a partially sectional side view showing the driving side of the device shown in FIG. 5.

The structure of a driving side of the transmission operating device is described below. As shown in FIGS. 5 and 6, numeral 21 indicates a change speed lever and numeral 22 indicates a connecting arm. The change speed lever 21 has a grip 21a (shown in FIG. 7) at its top end, and is supported on a frame of a vehicle by means of a ball joint 23 at its middle portion. The ball joint 23 is provided with a mechanism for preventing the change speed lever 21 from rotating around the change speed lever 21. The mechanism comprises a slider (or a roller) 23c provided to an end of a pin-like member 23b planted in a ball portion 23a of the ball joint 23, and a guiding groove 23e formed in a socket 23d, which is fixed to a frame, of the ball joint 23 so that the slider 23c can be guided within the guiding groove 23e only in the vertical direction. Therefore, the change speed lever 21 cannot be rotated around the axis of the change speed lever 21, but can be operated in the direction perpendicular to the direction that the control cables extend and in the direction that the control cables extend.

The change speed lever 21 has a ball portion 25a of a ball joint 25 at its lower end, while the connecting arm 22 has a socket 25b of the ball joint 25. The ball portion 25a is engaged with the socket 25b and, therefore, the connecting arm 22 is connected with the change speed lever 21. In that case, the change speed lever 1 may have the socket and the connecting arm 22 may have the ball portion.

One end of a rod 28 is connected with one end of the connecting arm 22 by means of a ball joint 26. A rod 29 is connected with the other end of the connecting arm 22 by means of a ball joint 27. The other end of the rod 28 is connected with an end of the inner wire 1c of the control cable 1. The other end of the rod 29 is connected with an end of the inner wire 2c of the control cable 2. The connecting arm 22 has a ball joint 34, which is a rotational center, at a position apart from the socket 25b of the connecting arm 22. One end of a swinging arm 35 is connected with the connecting arm 22 by means of the ball joint 34. The other end of the swinging arm 35 is connected with a frame, for example, indicated by numeral 24 in in FIG. 5, by means of a ball joint 36.

Figure 7:
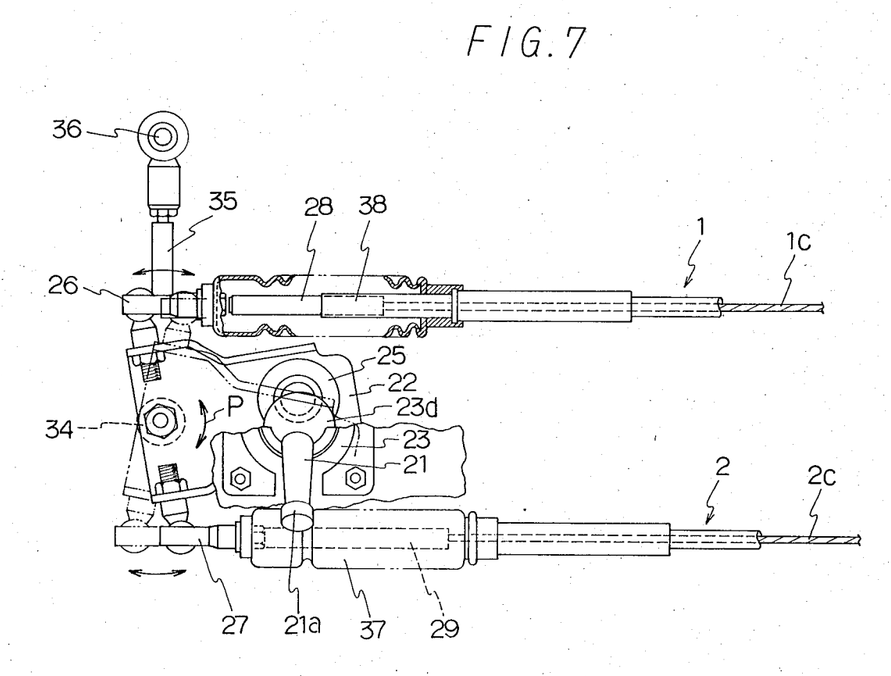
FIGS. 7 and 8 are views illustrating motions of the driving side showing in FIGS. 5 and 6.

The operation of the driving side of the device is described below. When the change speed lever 21 is operated in the direction perpendicular to the direction that the control cables 1, 2 extend, as shown in FIG. 7, the connecting arm 22 rotates in the direction of Arrow P with respect to the ball joint 34. Therefore, the rod 28 and the inner wire 1c are pulled (pushed) at the same time when the rod 29 and the inner wire 2c are pushed (pulled).

Figure 8:
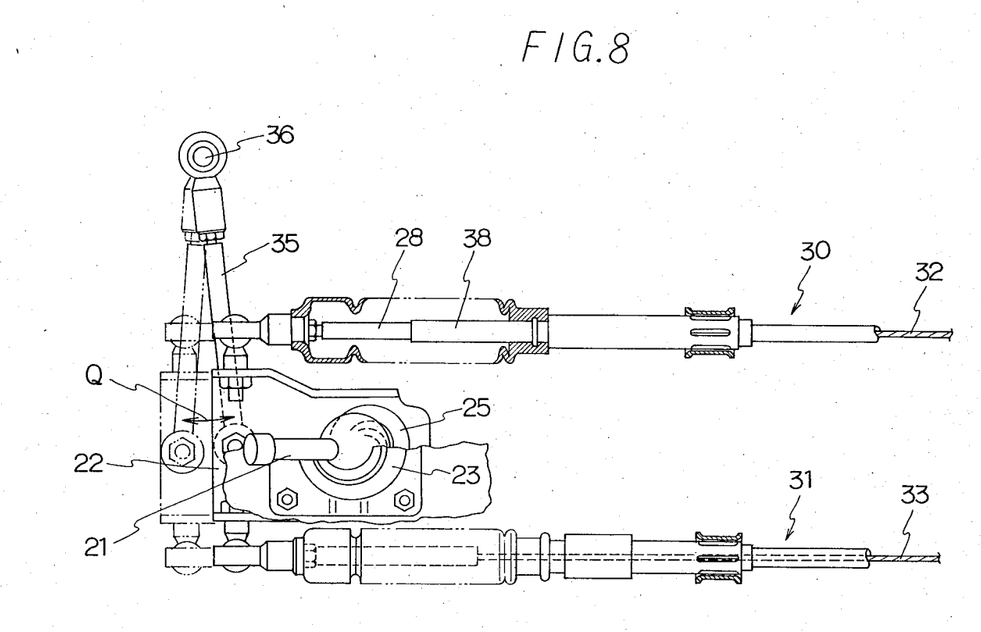

When the change speed lever 21 is operated in the direction that the control cables 1, 2 extend, as shown in FIG. 8, the connecting arm 22 swings in the direction of Arrow Q with respect to the ball joint 36. Therefore, the rod 28 and the inner wire 1c, and the rod 29 and the inner wire 2c are pushed or pulled in the same direction with each other at the same time.

In the above described operation, the connecting arm 22 is compellingly rotated in the direction of Arrow P and moved in the direction of Arrow Q by operating the change speed lever 21, since the lower end of the change speed lever 21 and the one end of the swinging arm 35 are connected with the connecting arm 22 by means of the ball joints 25, 34, respectively. In that case, the inclination of the connecting arm 22 with respect to the holizontal plane is not dependent on the inclination of the change speed lever 21, but follows to the motions of the rods 28, 29 and the swinging rod 35. Therefore, the rods 28, 29 and the inner wire 1c, 2c receive only forces applied in the direction of the axes of the rods and the wires. As a result, the inner wires substantially do not receive a bending moment and a shearing force, advantageously.

Further, the rods 28, 29 receive only the axial forces, so that the rods 28, 29 can be guided within a guide 38 for surely guiding the rods 28, 29 only in the axial direction. As a result, it advantageously becomes hard to occur a buckling of the inner wires 1a, 2a.

In the driving side of the device shown in FIGS. 5 to 8, one end of the swinging arm 35, of which the other end is connected with the frame by means of the ball joint 36, is connected with the connecting arm 22 by means of the ball joint 34 at the rotational center. However, the present invention is not limited to such a structure. Supporting members, such as a ball joint constructed so as to slide in the direction that the control cables 1, 2 extend (not shown in the drawing), for supporting the connecting arm 22 so as to move the connecting arm 22 in the direction that the control cables 1, 2 extend and so as to rotate around the vertical axis at the rotational center can be also employed.

Some of the embodiments of the present invention are described above. However, the present invention is not limited to such embodiments. For example, though the shaft 7 is located at the side of the splined perforation 8, the shaft 7 may be located above the splined perforation 8. According to this structure, the size around the connecting arm 3 and the casing 6 in the longitudinal direction can be decreased.

Further, in the above described embodiment, the casing 6 is supported by means of the ball joint 11. However, a rod may be provided to the supporting frame 12 and, rotatably and slidably inserted into a perforation formed in the splined shaft 9. Therefore, the casing 6 and the connecting arm 3 can be rotated in a vertical plane.

Further, in the above described embodiment, the link mechanism 17 employs ball joints 13, 15. However, the following sliding mechanism can be employed. That is to say, the sliding mechanism is provided, for absorbing the motion in the direction perpendicular to the direction (of Arrow A, in FIG. 4a) that the outer shaft 10 slides, between the connecting arm 3 and the lever 14 or between the lever 14 and the lever 16. According to such a mechanism, the rotational motion of the connecting arm 3 is smoothly changed into the sliding motion of the outer shaft 10. Further, various modifications can be applied to the device of the present invention.

In the driven side of the transmission operating device, the mechanism is much simplified, that is to say, the outer shaft is directly rotated by the spline structure, and a play of the mechanism is reduced. Therefore, the operation of the transmission can be more promptly and surely performed. Further, the number of the parts of the mechanism is reduced, so that the vibration of the mechanism is reduced and the durability thereof is increased.

In the driving side of the transmission operating device, the inner wires and the rods connected with the inner wires of the control cables do not receive a bending moment and/or a shearing force, since the change speed lever and the connecting arm are connected with each other by means of the ball joint. Further, the mechanism is much simplified, and a play of the mechanism is reduced. Therefore, the operation of the transmission can be more promptly and surely performed. Further, the number of the parts of the mechanism is reduced, so that the vibration of the mechanism is reduced and the durability thereof is increased.

What is claimed is:

1. A transmission operating device comprising:
   (a) a connecting arm of which both ends are connected with ends of two control cables, respectively, and having a first rotational center for rotating the connecting arm in a horizontal plane and a second rotational center for rotating the connecting arm in a vertical plane, and being constructed so that the connecting arm is rotated in the horizontal plane when the inner wires are pushed or pulled in the reverse direction with each other at the same time, and so that the connecting arm is rotated in the vertical plane when the inner wires are pushed or pulled in the same direction with each other at the same time;
   (b) a member to be rotated together with the connecting arm, being provided with a splined perforation;
   (c) a splined shaft being a part of an outer shaft of a transmission, and being inserted into the splined perforation, so that the rotaional motion of the connecting arm in the vertical plane is changed into a rotational motion of the outer shaft around an axis of the outer shaft; and
   (d) a link mechanism being provided between the connecting arm and the outer shaft, so that the rotational motion of the connecting arm in the horizontal plane is changed into a sliding motion of the outer shaft in the direction of an axis of the outer shaft.

2. The device of claim 1, wherein a shifting operation is performed by the rotational motion of the outer shaft around the axis of the outer shaft.

3. A transmission operating device constructed so as to perform a shifting operation and a selecting operation by pushing or pulling two inner wires of two control cables arranged parallel to each other, at a driven side of the device, comprising:
  (a) a first connecting arm of which both ends are connected with ends of two control cables, respectively, and having a first rotational center for rotating the first connecting member in a horizontal plane and a second rotational center for rotating the first connecting arm in a vertical plane, and being constructed so that the first connecting arm is rotated in the horizontal plane when the inner wires are pushed or pulled in the reverse direction with each other at the same time, and so that the first connecting arm is rotated in the vertical plane when the inner wires are pushed or pulled in the same direction with each other at the same time;
  (b) a member to be rotated together with the first connecting arm, being provided with a splined perforation
  (c) a splined shaft being a part of an outer shaft of a transmission, and being inserted into the splined perforation, so that the rotational motion of the connecting arm in the vertical plane is changed into a rotational motion of the outer shaft around an axis of the outer shaft; and
  (d) a link mechanism being provided between the first connecting arm and the outer shaft, so that the rotational motion of the first connecting arm in the horizontal plane is changed into a sliding motion of the outer shaft in the direction of an axis of the outer shaft and, further, at a driving side of the device, comprising:
  (e) a change speed lever being supported at its middle portion so as to be operated in the direction that the two control cables extend and in the direction perpendicular to the direction that the two control cables extend;
  (f) a second connecting arm being connected with a lower end portion of the change speed lever by means of a ball joint;
  (g) connecting members for connecting the two inner wires of the two control cables with the second connecting arm; and
  (h) a third rotational center being located at the position on the second connecting arm apart from the position where the lower end portion of the change speed lever is connected with the second connecting arm, and, at which the second connecting arm is supported so as to rotate around the vertical axis at the rotational center and move in the direction that the two control cables extend.

4. The device of claim 3, wherein the shifting operation is performed by the rotational motion of the outer shaft around the axis of the outer shaft.

5. The device of claim 3, wherein the connecting members comprise rods connecting the inner wires with the both ends of the second connecting arm, respectively, and guides for slidably guiding the rods in the axis of the rods.

* * * * *